United States Patent
Kearney (12)

(10) Patent No.: US 6,418,964 B1
(45) Date of Patent: Jul. 16, 2002

(54) BEARING-SUPPORTED DAMPER ASSEMBLY

(76) Inventor: James F. Kearney, 70 Nelson St., Farmingdale, NY (US) 11735

(*) Notice: Subject to any disclaimer, the term of this patent is extended or adjusted under 35 U.S.C. 154(b) by 0 days.

(21) Appl. No.: 09/627,902

(22) Filed: Jul. 27, 2000

(51) Int. Cl.[7] .................................................. F16K 1/22
(52) U.S. Cl. ............................... 137/601.09; 137/601.11
(58) Field of Search ....................... 137/601.09, 601.11, 137/601.15

(56) References Cited

U.S. PATENT DOCUMENTS

| | | | | |
|---|---|---|---|---|
| 3,696,804 A | * | 10/1972 | Paredes | 126/285 R |
| 4,191,212 A | * | 3/1980 | Hagar | 137/601 |
| 4,377,350 A | * | 3/1983 | Josephson | 403/161 |
| 5,845,999 A | * | 12/1998 | Kearney | 137/315.01 |

* cited by examiner

*Primary Examiner*—Stephen M. Hepperle
(74) *Attorney, Agent, or Firm*—Schweitzer Cornman Gross & Bondell LLP

(57) ABSTRACT

A damper system has a frame within which a plurality of pivotally supported vanes are actuated by linkage rods pivotally connected to the vanes by rocker brackets and trunion pivots. The trunion pivots include bearing assemblies seated within bearing-receiving recesses in the rocker bracket to provide free pivotal movement of the linkage rods with respect to the vanes.

13 Claims, 5 Drawing Sheets

BEARING-SUPPORTED DAMPER ASSEMBLY

FIELD OF INVENTION

The invention of the applicant generally relates to improvements in damper systems, and in particular, to damper systems having a plurality of interconnected vanes pivotally mounted within a support frame.

BACKGROUND AND SUMMARY OF THE INVENTION

Conventional damping systems typically include vanes with support or "control" rods simply mounted in a support frame. The vanes are activated by linkage rods which are pivotally connected to the vanes by rocker brackets and trunion pivots. However, when used in dirty or dusty environments, such conventional devices usually result in unreliable and unacceptable operation because friction producing substances get between the support frame and the control rods, and between the linkage rods, trunions, and rocker brackets.

The present invention improves upon conventional damping systems by incorporating sealed bearing assemblies connected to the control rods and trunions. The sealed bearings are mechanically affixed to the associated control rods or trunions permitting the damper blades to move upon completely sealed ball or needle bearings resulting in efficient dampers that are capable of freely opening and closing regardless of the environment in which the dampers are operating.

DETAILED DESCRIPTION

Figure 1:
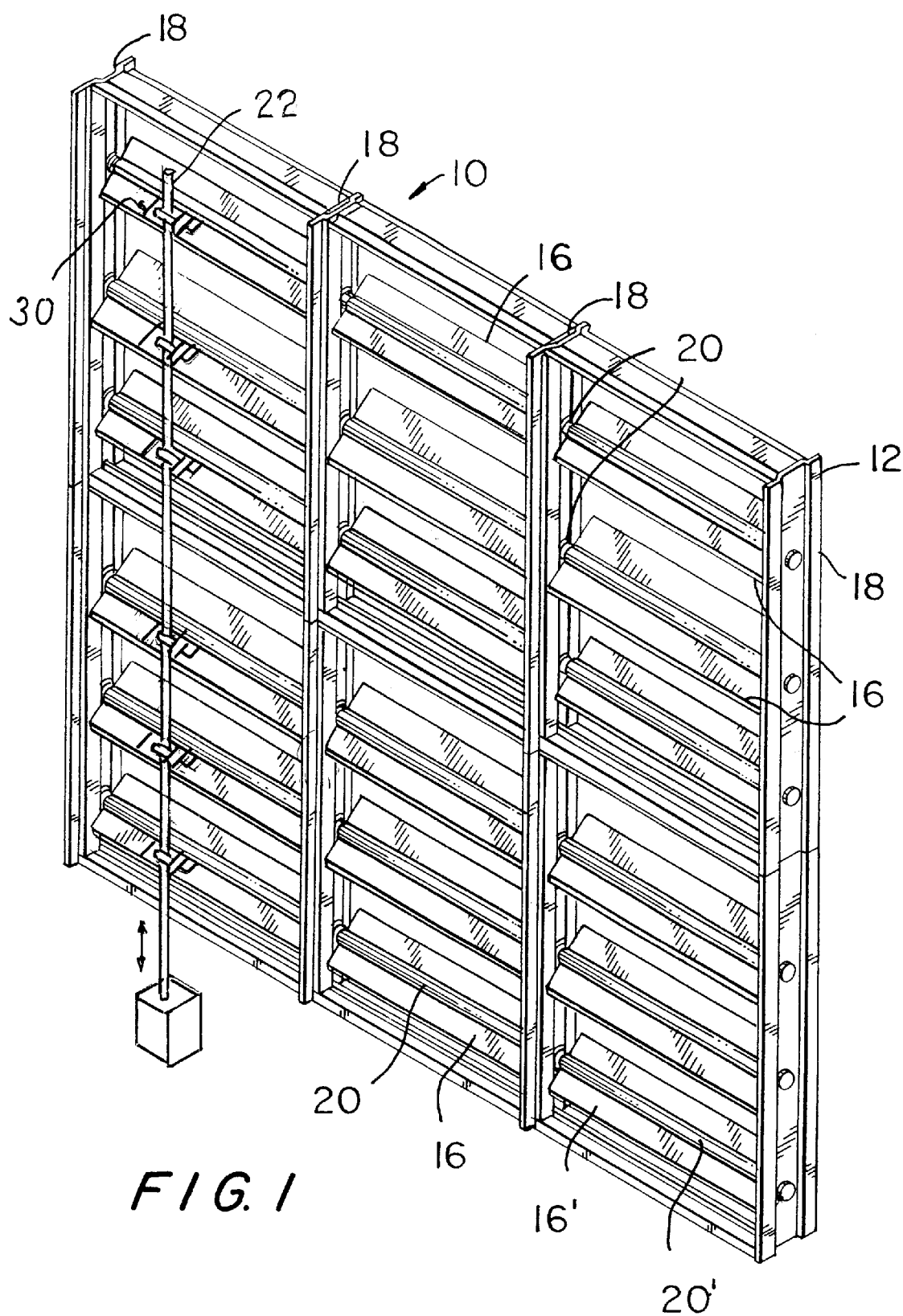
FIG. 1 is a perspective view of a damper assembly according to the present invention.
Figure 2:
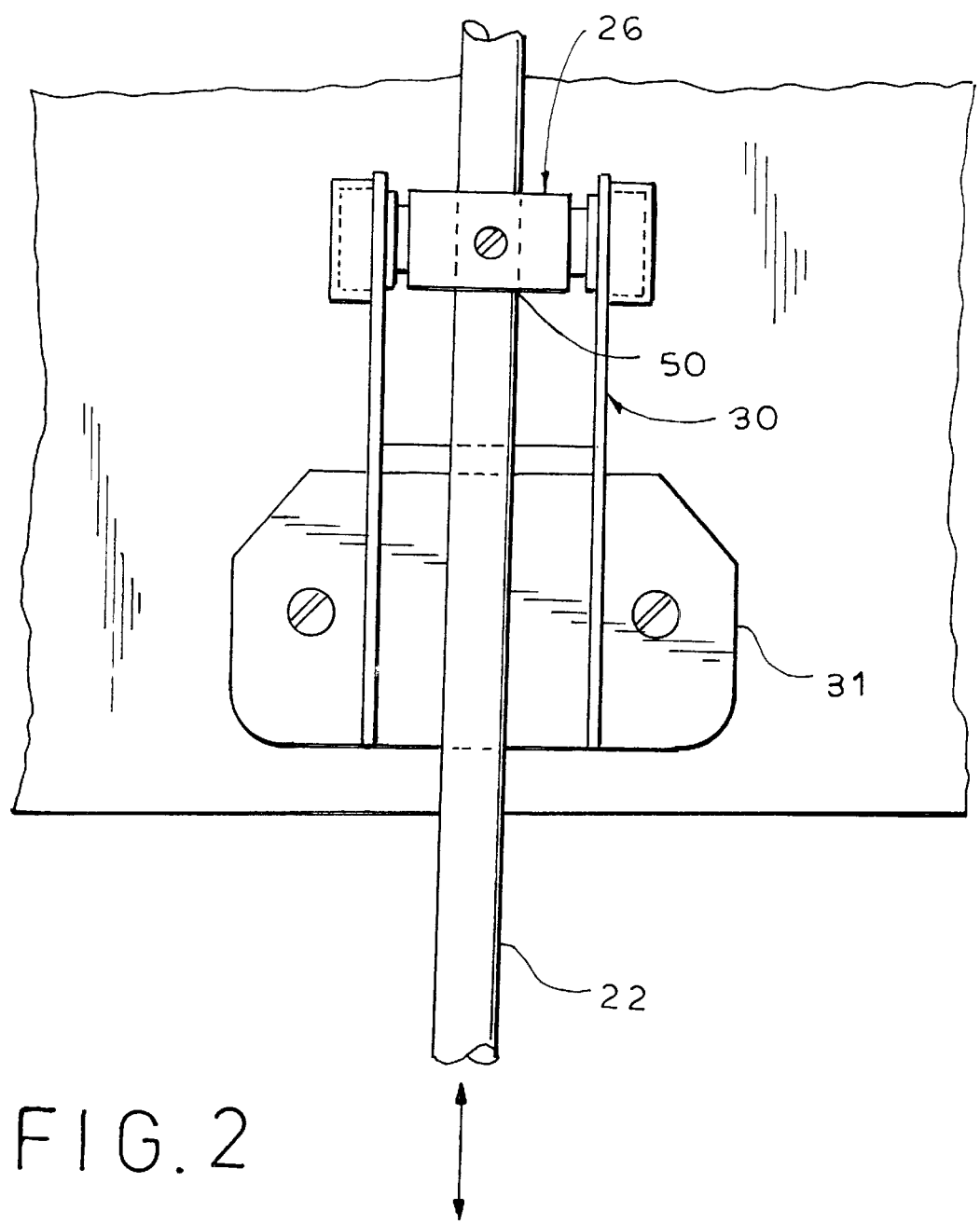
FIG. 2 is a close-up front elevational view of the damper assembly of FIG. 1.

Referring to the drawing, and initially to FIGS. 1 and 2 thereof, the damper system 10 of the present invention includes a frame 12 with a number of usually vertical, spaced-apart support members 18. The damper system 10 also includes a plurality of vanes 16 which are rotatably supported between the support members 18 on support (or "control") rods 20. Bearing assemblies, such as those disclosed in the applicant's copending U.S. application Ser. No. 08/734,926, now U.S. Pat No. 5,845,999 are preferably fixedly connected to the ends of the control rods 20 to provide frictionless rotational support for the vanes 16, thereby greatly reducing the rotational resistance of the vanes 16.

The vanes 16 are rotated by a linkage rod 22 pivotally connected to the vanes 16 by rocker brackets 24 via the novel bearing-supported trunion pivots 26. The linkage rod 22 is actuated by an actuator 28 which can be of any suitable type. It should be noted that the linkage rod configuration depicted is only one of many possible configurations which can incorporate the present invention. For example, the linkage rod 22 could be connected to every alternate vane, with intermediate vanes connected to the "driver" vanes by secondary linkage rods. The secondary linkage rods would be connected to the "driver" and "driven" vanes by separate rocker brackets and bearing-supported trunion pivots.

Referring specifically to FIG. 2, the linkage rod 22 is fixedly attached to the trunion pivot 26 preferably by a set screw 27. The trunion pivot 26 is rotatably seated in a rocker bracket 30 which, in turn, is fixedly attached to the vane 16, thus providing an essentially frictionless pivotal connection between the linkage rod 22 and the rocker bracket 30.

Figure 3:
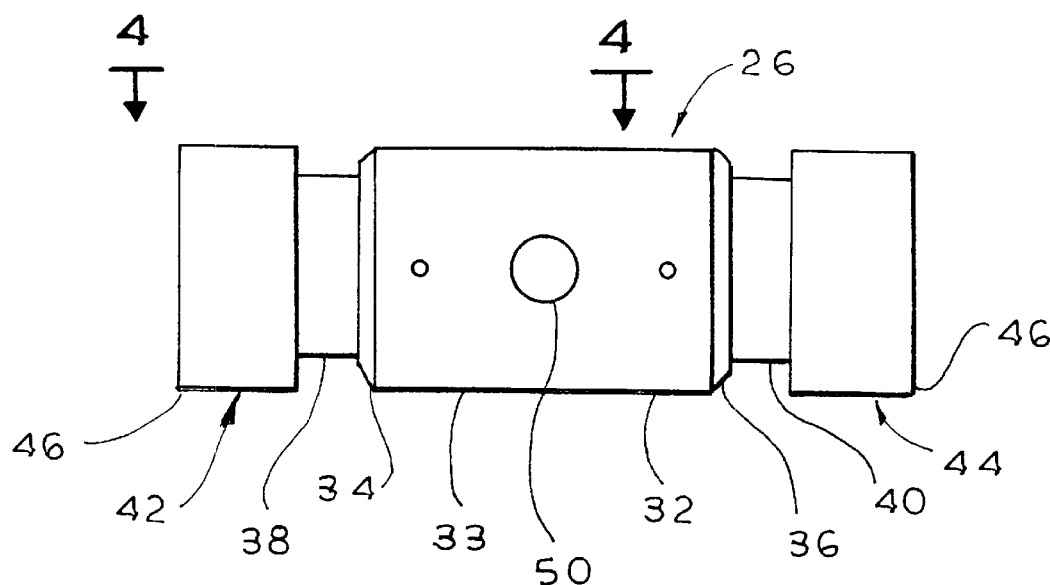
FIG. 3 is a side elevational view of the bearing-supported trunion pivot of the present invention.
Figure 4:
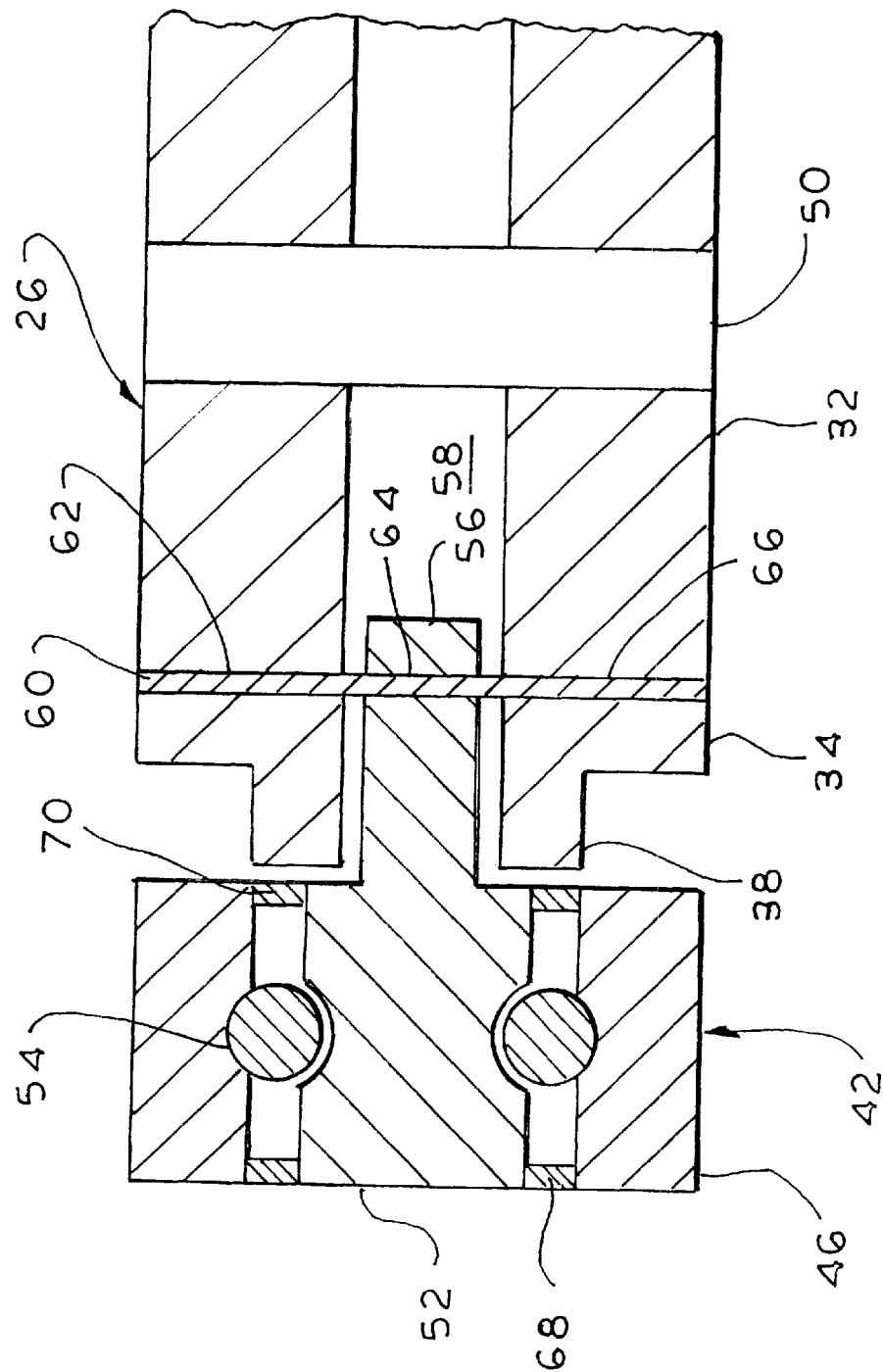
FIG. 4 is a side, cross sectional elevational view taken along line 4—4 of FIG. 3.

Referring to FIGS. 3 and 4, the trunion pivot 26 includes a body portion 32 having end portions 34,36. The body portion 32 of the trunion pivot 26 preferably has a cylindrical center section 33 of substantially constant diameter. The end portions 34, 36 preferably include neck portions 38,40 having a diameter less than that of the center section 33 of the body portion 32. Connected to the end portions 34, 36 are bearing assemblies 42,44 which have outer housings 46,48, preferably of the same diameter as that of the center portion 33. The body portion 33 of the trunion pivot 26 preferably includes a through-hole 50 for receipt of the linkage rod 22 therethrough. In addition, the trunion pivot 26 preferably includes a set hole and the associated set screw (not shown here) which communicates with the through-hole 50 for fixedly connecting the linkage rod 22 to the body portion 32 of the trunion pivot 26.

Referring to FIG. 4, the trunion pivot 26 is preferably symmetrical such that the bearing assemblies 42,44 are identical. With respect to one end, the inner core 52 and an outer housing 46 enclose either pin- or, as shown, ball-type bearing elements 54. The core 52 preferably has an integral, outwardly extending end 56 which extends from the housing 46 and is received within a recess 58 in the end portion 34 of the body portion 32 of the trunion pivot 26. The extending end 56 of the inner core 52 can be hollow or solid, as shown, and can be fixedly connected to the body portion 32 via mechanical fastening means 60 (such as a spring dowel) inserted through aligned holes 62, 64, 66 in the body portion 32 and the extending end 56 of the inner race 52.

The overall length of the trunion pivot 26 is preferably about 1.5 inches, and the diameter of the outer housings 46,48 and the center portion 33 are all preferably about one-half inch in diameter. The neck portions are preferably about ⅜ inch in diameter. The width of the neck portions 38,40 are preferably about ⅛ to ¹⁄₁₆ inch each, and the width of the bearing assemblies 42,44 (i.e., the outer housings 46,48 thereof) are each preferably about ¼ inch. Thus, the length of the center portion 32 of the trunion pivot 26 is preferably about ¾ to ⅞ inch. The through-hole 54 receiving the linkage rod 22 is preferably about ⁹⁄₃₂ inch in diameter to receive the preferably ¼ inch diameter linkage rod 22. The aligned holes 62,64,66 in the body portion 32 and extending end 56 of the inner race 52 for receipt of the fastening means 60 are each about preferably ⁵⁄₆₄ inch in diameter for receipt of a ⅜ inch long dowel pin. The recess 58 in the end portion 34 of the body portion 32 of the trunion pivot 26 is preferably about ¼ inch in diameter for receiving the extending end 56 of the inner core 52, which extending end 56 is preferably about ³⁄₁₆ inch in diameter.

As shown, the recess 58 can extend the full length of the body portion 32, intersecting with the through-hole 50. However, the recess 58 can be sized according to the length of the extending end of the inner core 52 which is preferably about ¼ to ⅜ inch in length as measured from an extreme end portion of the body portion 32 of the trunion pivot 26.

The bearing assemblies 46,48 each preferably include one row of bearing elements 54 which can be aligned by a spacing element (not shown). The bearing elements are preferably 10 in number with a diameter of 3/32 inch. The junction between the outer housing 46 and inner race 52 is preferably sealed with sealing rings 68,70 to prevent the ingress of particles and other contaminants.

Figure 5:
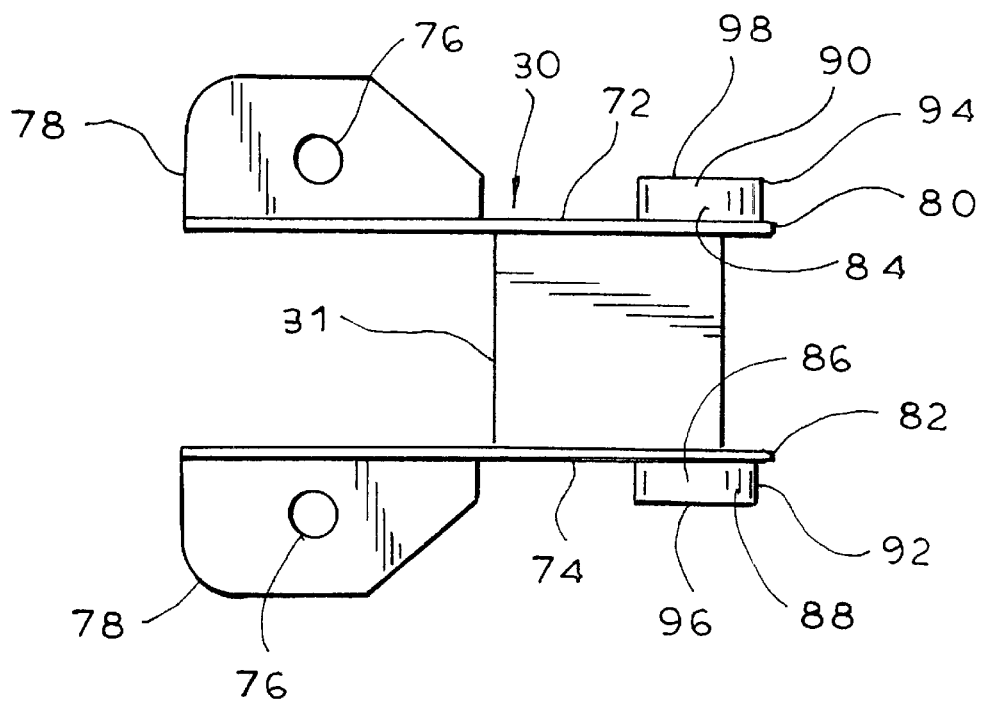
FIGS. 5–7 are top, front and side elevational views, respectively of the rocker bracket of the present invention.
Figure 6:
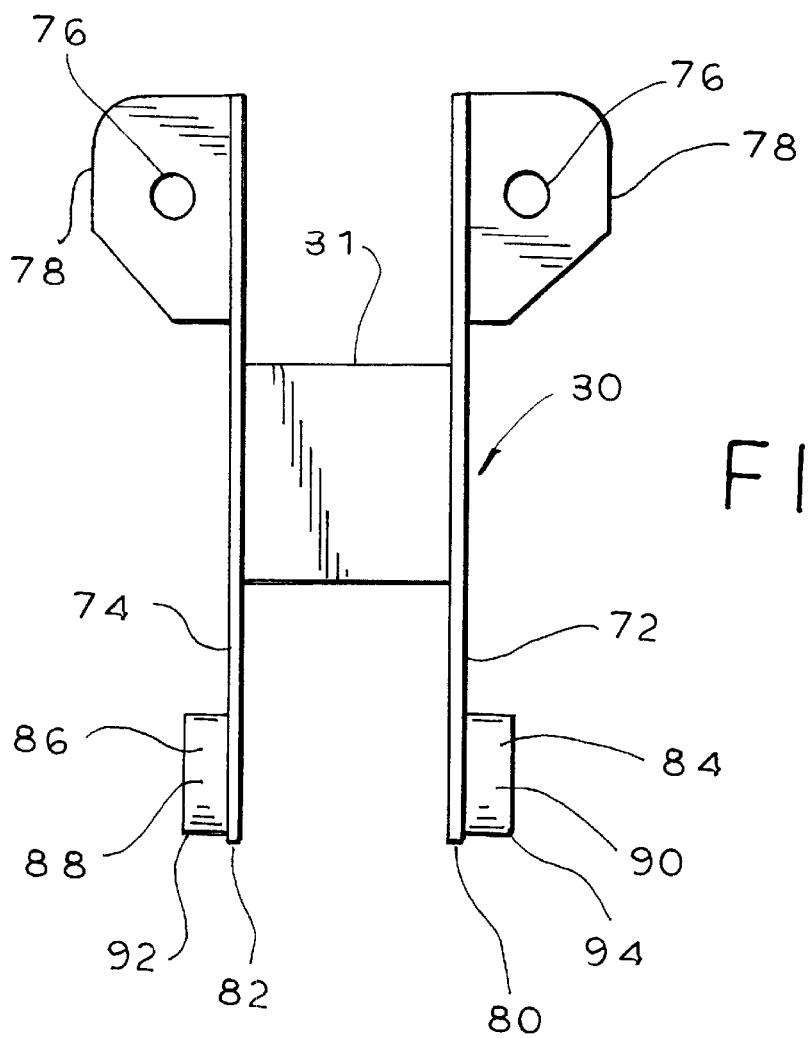
Figure 7:
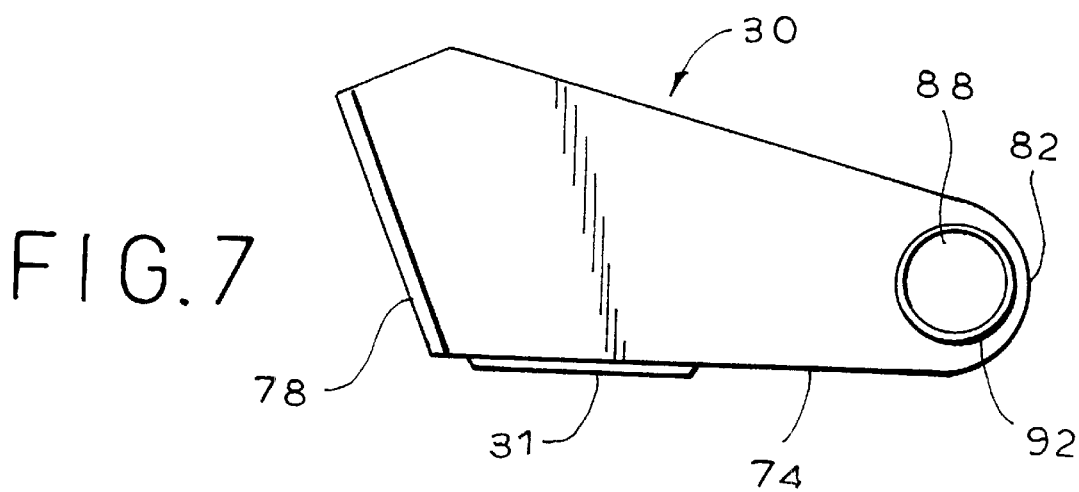

Referring to FIGS. 5–7, the rocker bracket 30 includes wings 72,74 rigidly interconnected by a center member 31, and is fixedly connected to the vane (not shown) via suitable fastening means directed through mounting holes 76 in flanges 78. The outward ends 80,82 of the wings 72,74 include bearing-supporting recesses 84,86, here shown formed by the through holes 88,90 and surrounding bearing-supporting collars 92,94. The rocker bracket 30 is preferably integrally formed by die cutting and stamping in a low cost, high volume manner. Specifically, the through holes 88,90 and collars 92,94 can be formed by progressive die stamping. The bearing-receiving recesses 84,86, including the through-holes 88,90 and bearing supporting collars 92,94 are sized and shaped to closely receive the bearing assemblies 42,44 therein. Preferably, the rocker bracket 30 and trunion pivot 26 are designed such that the trunion pivot 26 can be slidably inserted into the rocker bracket 30 through one of the through-holes 88,90.

The bearing-receiving recesses 84,86 are located to simultaneously contact both bearing assemblies 42,44 of the trunion pivot 26 when the trunion pivot 26 is inserted into the rocker bracket 30. Thus, preferably the outward ends 96,98 of the bearing-receiving recesses 84,86 are spaced apart a distance substantially equal to the distance between the outward ends of the outer housings 46,48 of the bearing assemblies 42,44 of the trunion pivot 26. In addition, the width of the bearing-supporting collars 92,94 plus the thickness of the material forming the wings 72,74 is preferably substantially equal to the width of the outer housings 46,48 such that the bearing-receiving recesses 84,86 substantially cover the outer housings 46,48 of the bearing assemblies 42,44. The material forming the wings 72,74 of the rocker bracket 30 preferably has a thickness of about 0.06 inches, therefore, the bearing-supporting collars 92,94 each preferably have a width of about 0.19 inches. The through-holes 88,90 each have a diameter slightly larger than the diameters of the outer housings 46,48 and the body portion 32 of the trunion pivot 26 such that the trunion pivot 26 may be slidably received within the mounting bracket 30. Therefore, the through-holes 88,90 and the bearing-supporting collars 92,94 each have an inside diameter of approximately 0.52 inches.

Referring then to FIG. 2, when the trunion pivot 26 is inserted into the mounting bracket 30 and the linkage rod 22 is fixedly attached to the trunion pivot 26 through the through-hole 50, the pivotal connection between the linkage rod 22 and the rocker bracket 30 is substantially frictionless. Therefore, in comparison to prior art designs, the present invention significantly reduces the force and energy required to actuate the damper system while simultaneously increasing the lifespan of the components.

It can be appreciated that the trunion pivots and rocker brackets of the type used in the present invention are inexpensive to manufacture and incorporate into a damper system. Thus, the novel structure of a damper system with trunion pivots having sealed bearing assemblies seated in specially adapted rocker brackets allowing for free pivotal movement of the linkage rod with respect to the vanes provides significant improvements in energy consumption and longevity while avoiding any substantial increase in production costs. The savings and efficiency are magnified in damper systems which have numerous trunion pivots.

It should be understood, of course, that the specific form of the invention herein illustrated and described is intended to be representative only, as certain changes may be made therein without departing from the clear teachings of the disclosure. Specifically, the applicant's invention also contemplates sealed bearings incorporated as an integral part of the control rods at either their terminal ends or mid-sections. Accordingly, reference should be made to the following appended claims in determining the full scope of the invention.

I Claim:

1. A damper assembly, comprising:
   (a) a frame including two spaced-apart support members;
   (b) a vane pivotally supported between said two support members;
   (c) a rocker bracket connected to said vane;
   (d) a linkage rod for actuating said vane;
   (g) a trunion pivot connected to said linkage rod, said trunion pivot including:
      (i) a body portion with first and second end portions;
      (ii) first and second bearing assemblies connected to said respective first and second end portions; and
      (iii) each of said first and second bearing assemblies having an inner race and having an outer housing, and having rotational bearing elements enclosed between said inner race and said outer housing; and
   (f) said outer housing of each of said first and second bearing assemblies of said trunion pivot contacting said rocker bracket to provide free pivotal movement of said linkage rod with respect to said rocker bracket and with respect to said vane.

2. A damper assembly as in claim 1, wherein:
   (a) said rocker bracket includes two opposed, spaced-apart wings each having a bearing-receiving recess for supporting one of said bearing assemblies;
   (b) said bearing-receiving recesses are spaced apart a distance substantially equal to a distance between said bearimng assemblies.

3. A damper assembly as in claim 1, wherein:
   (a) each said inner race of said first and second bearing assemblies of said trunion pivot include a recess; and
   (b) each said first and second end of said body portion of said trunion bearing include an outwardly-extending end sized and shaped to be closely received into said recess of an associated bearing assembly of said trunion bearing.

4. A damper assembly as in claim 1, wherein:
   (a) said rocker bracket further comprises two, spaced-apart wings, each having a bearing-receiving recess; and
   (b) said outer housings of each of said first and second bearing assemblies are sized and shaped to be slidably received within one of said bearing-receiving recesses.

5. A damper assembly as in claim 4, wherein said wings each include bearing-supporting collars disposed around said bearing-receiving recesses, said bearing-supporting collars being located to contact said outer housings of said first and second bearing assemblies.

6. A damper assembly as in claim 5, wherein said bearing-receiving recesses comprise through holes in said wings and wherein said body portion of said trunion bearing is sized and shaped to be slidably received within said rocker bracket through one of said through holes.

7. A damper assembly as in claim 1, wherein:
(a) said vane includes two control rods extending from opposite ends thereof for pivotal support; and
(b) control rod bearing assemblies are connected to said two control rods, said control rod bearing assemblies being supported by said support members and providing for free pivotal support of said vane with respect to said frame.

8. A damper assembly, comprising:
(a) a frame including two spaced-apart support members;
(b) a first and second vanes pivotally supported between said two support members;
(c) first and second rocker brackets connected to said first vane, a third rocker bracket connected to said second vane;
(d) first and second linkage rods for actuating said vanes;
(e) first, second and third trunion pivots, each including:
    (i) a body portion with first and second end portions;
    (ii) first and second bearing assemblies connected to said respective first and second end portions; and
    (iii) each of said fist and second bearing assemblies having an inner race and having an outer housing, and having rotational bearing elements enclosed between said inner race and said outer housing;
(f) said first trunion pivot being connected to said first linkage rod, and said second and third trunion pivots being connected to said second linkage rod;
(g) with respect to said first, second and third trunion bearings, said outer housings of said bearing assemblies of each said first, second and third trunion pivots respectively contacting said first, second and third rocker brackets to provide free pivotal movement of said first and second linkage rods with respect to rocker brackets and with respect to said vanes.

9. A damper assembly as in claim 8, further comprising:
(a) a third vane pivotally supported between said two support members;
(b) a fourth rocker bracket connected to said third vane;
(c) a fourth trunion pivot, said fourth trunion bearing being connected to said first linkage rod, and including:
    (i) a body portion with first and second ends;
    (ii) first and second bearing assemblies connected to said respective first and second ends; and
    (iii) each of said fist and second bearing assemblies having an inner race and having an outer housing, and having rotational bearing elements enclosed between said inner race and said outer housing;
(d) said outer housings of said bearing assemblies of said fourth trunion pivot each contacting said fourth rocker bracket to provide free pivotal movement of said first linkage rod with respect to said fourth rocker bracket and with respect to said third vane.

10. A damper assembly as in claim 9 wherein
(a) said first, second, third and fourth rocker brackets each include a set of bearing-receiving recesses, said sets of bearing-receiving recesses being substantially identical to one another; and
(b) said first, second, third and fourth trunion pivots being substantially identical.

11. A damper assembly, comprising:
(a) a frame including two spaced-apart support members;
(b) a vane pivotally supported between said two support members;
(c) a rocker bracket connected to said vane;
(d) a linkage rod for actuating said vane;
(e) a trunion pivot connected to said linkage rod, said trunion pivot including:
    (i) a body portion with first and second end portions;
    (ii) first and second bearing assemblies connected to said respective first and second end portions; and
    (iii) each of said first and second bearing assemblies having an inner race and having an outer housing, and having rotational bearing elements enclosed between said inner race and said outer housing;
(f) said outer housing of each of said first and second bearing assemblies of said trunion pivot contacting said rocker bracket to provide free pivotal movement of said linkage rod with respect to said rocker bracket and with respect to said vane;
(g) said rocker bracket includes two opposed, spaced-apart wings each having a bearing-receiving recess for supporting one of said bearing assemblies;
(h) said bearing-receiving recesses are spaced apart a distance substantially equal to a distance between said bearing assemblies;
(i) each said inner race of said first and second bearing assemblies of said trunion pivot extends outward from the associated outer housing; and
(j) each said first and second end portions of said body portion of said trunion pivot includes a recess sized and shaped to receive said outwardly-extending end of said inner races of said first and second bearing assemblies.

12. A damper assembly as in claim 11, wherein said trunion pivot includes fastening means directed through said body portion and through said outwardly-extending ends of said inner races of said first and second bearing assemblies for fixedly attaching said bearing assemblies to said body portion.

13. A damper assembly as in claim 12, wherein said trunion pivot includes a linkage rod-receiving hole between said recesses in said first and second end portions of said body portion, said linkage rod-receiving hole being sized and shaped to slidably receive said linkage rod.

* * * * *